Jan. 7, 1947.    T. E. HYDE    2,413,768
PRECISION DIVIDER
Filed April 20, 1945    2 Sheets-Sheet 1
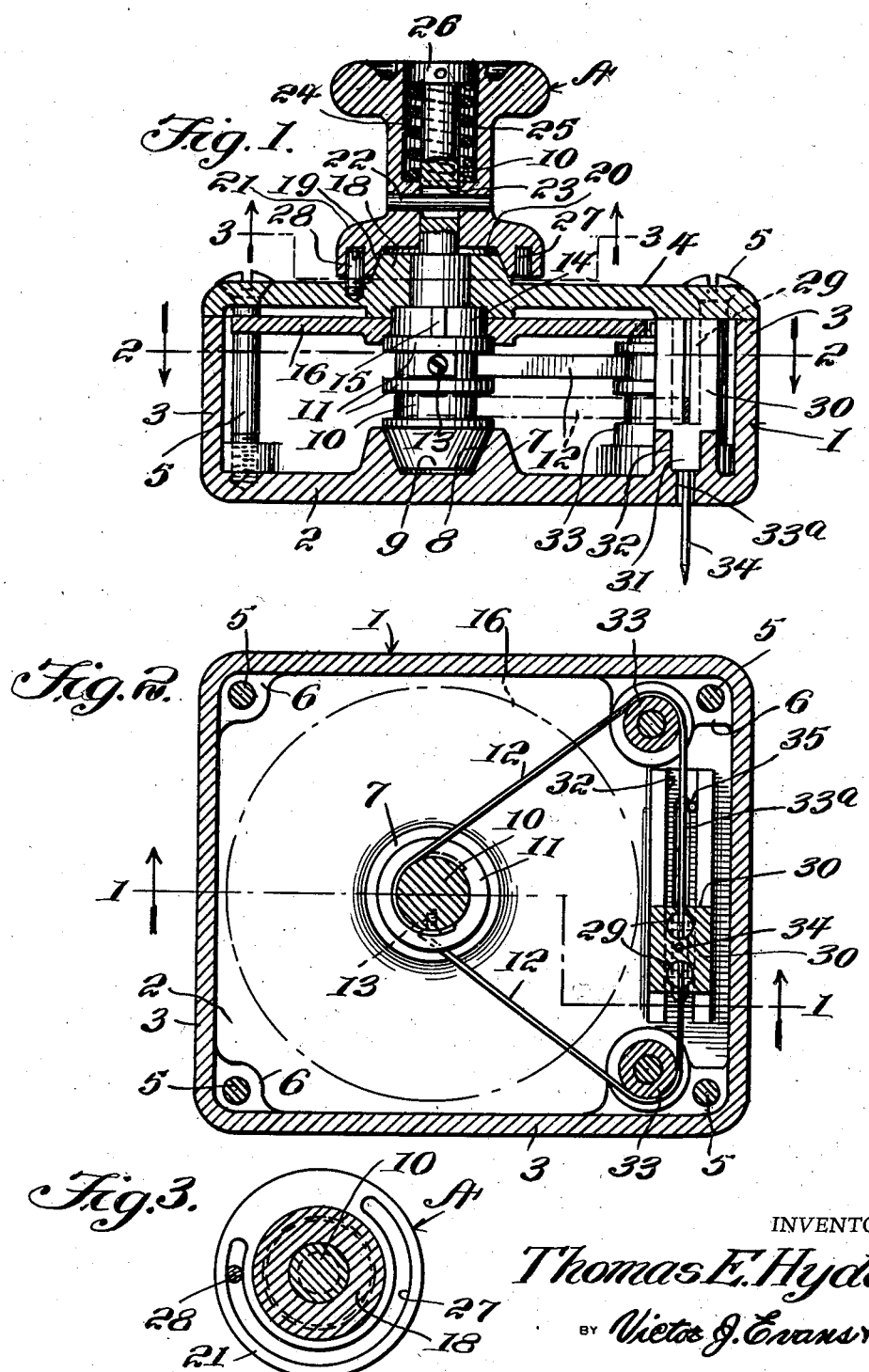
INVENTOR.
Thomas E. Hyde,
BY Victor J. Evans & Co.
ATTORNEYS Jan. 7, 1947.  T. E. HYDE  2,413,768
PRECISION DIVIDER
Filed April 20, 1945  2 Sheets-Sheet 2
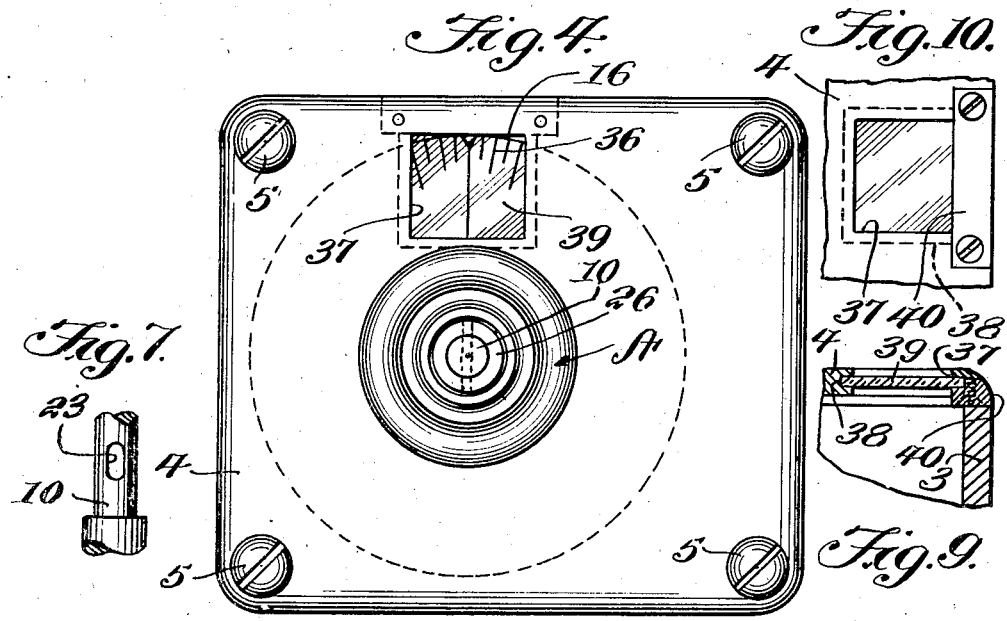
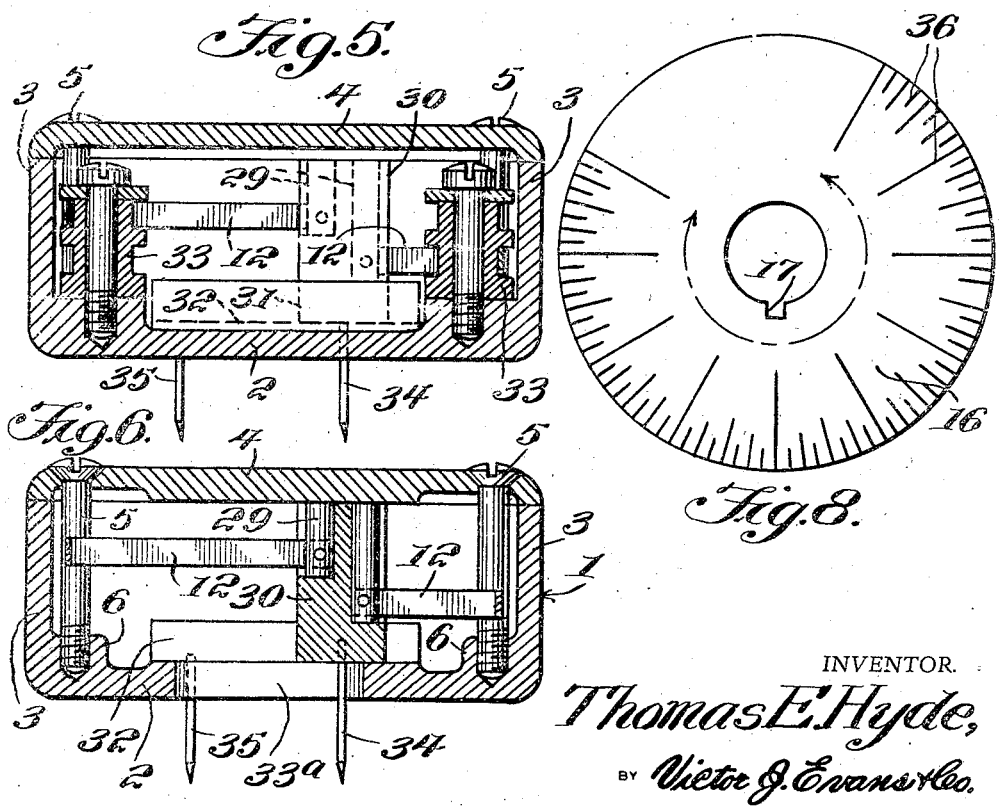
INVENTOR.
Thomas E. Hyde,
BY Victor J. Evans & Co.
ATTORNEYS Patented Jan. 7, 1947

2,413,768

UNITED STATES PATENT OFFICE 2,413,768

PRECISION DIVIDER

Thomas Edward Hyde, Raleigh, N. C.

Application April 20, 1945, Serial No. 589,402

6 Claims. (Cl. 33—158)

My present invention, in its broad aspect, has to do with improvements in precision dividers and is a simple, compact, easily operated instrument wherein a movable needle is actuated by oppositely wound tapes on a shaft to precisely take off spaces with reference to a fixed needle and indicate the measurements on a suitable dial. My invention is subject to less margin of error than compass and other dividers in that actuation of the movable needle is less subject to unconscious vagaries of the operation and the mechanism of the divider is more efficient from the standpoint of precision measurements. The dial indicator is so located that accurate readings may be quickly and conveniently made, and the mounting and mechanical control of the operating shaft and the operating knob is such that minute variations for mechanical control are eliminated.

Other and equally important objects and advantages of my invention will be apparent from the following description and drawings, and it is pointed out that changes in form, size, shape, materials, and construction and arrangement of parts is permissible and within the purview of my broad inventive concept and the scope of the appended claims.

In the drawings, wherein I have illustrated a preferred form of my invention:

Figure 1 is a vertical section; taken on the line 1—1 of Figure 2;

Figure 2 is a transverse section on the line 2—2 of Figure 1;

Figure 3 is a section on the line 3—3 of Figure 1;

Figure 4 is a top plan view;

Figure 5 is a vertical section taken on a line extending through the ports about which the tapes are turned;

Figure 6 is a vertical section taken on a line extending through the movable needle carrying block;

Figure 7 is a detail of the operating shaft showing the pin slot;

Figure 8 is a plan view of the dial;

Figure 9 is a detail section through the dial viewing window, and

Figure 10 is a plan view detail of the dial viewing window.

In the drawings wherein like characters of reference are used to designate like or similar parts:

The numeral 1 designates my rectangular casing, which has a bottom 2 and side and end walls 3, and a removable top 4 held in place by corner screws 5, the ends of which are engaged in corner bosses 6 on the bottom 2. The casing may be formed of plastic or other suitable material, and the edges are conveniently rounded off to provide a practical and handy unit. At a point near, but somewhat toward one end of the casing, and formed on the bottom is a circular boss 7 having a central cavity with sloping side walls 8 to receive the frustro-conical end 9 of a vertical operating shaft 10. The shaft has equally spaced annular flanges 11 above the end 9 to form spools for reversely wound steel tapes 12, the ends of which are attached to the shaft by screws 13. Above the spools is an enlarged portion 14 having a rib 15. A graduated circular dial 16 is mounted on the enlarged portion 14 and has a notch 17 fitting on the rib to prevent independent rotation. The shaft 10 is journalled in a boss 18 on the top 4 of the casing, and the boss has sloping walls 19 engaged by the sloping inner walls 20 of the enlarged base 21 of an operating knob A, which is attached to the shaft by a transverse pin 22 extending through a slot 23 in the shaft. The slot permits limited movement of the knob axially of the shaft. The knob has an enlarged bore 24 at the top to receive a spring 25 which bears against the enlarged head 26 on the shaft to normally press the knob down so that the sloping walls 19 and 20 have sufficient frictional engagement to prevent looseness or accidental turning of the shaft. The enlarged base of the knob has an annular slot 27 of about two-thirds the circumference of a circle, and a stop pin 28 on the top 4 and seating in the slot limits the turning movement of the knob and shaft.

The tapes 12 which may be made of steel or other suitable material, have their ends attached in the slots of pins 29 carried by a slidable block 30 which has a reduced end 31 fitting in key ways 32 on the bottom 2 of the casing to move parallel with one end of the casing. Each tape is turned about a flanged rotating spool 33, one adjacent each side wall of the casing so that the form in which the tapes are positioned approximates that of an equilateral triangle, as shown in Figure 2, so that as the shaft is turned in one direction or the other, the respective tapes are wound and unwound to move the block in the key-ways in a straight line. The bottom 2 has a straight slot 33a beneath the block and between the keyways through which a movable needle 34 extends, which needle is attached to the block and is the adjustable element of the divider. A fixed needle 35—set a little to one side of the needle 34—is mounted in the bottom for cooperation with the movable needle to form my divider, and the dial 16 is graduated as at 36 to show the measurements indicated by the position of the needles. The top is formed with a window 37 above the dial which has edge slots 38 to receive a glass pane 39, and a detachable plate 40 permits removal or replacement of the glass.

From the foregoing, it is believed that the operation and advantages of my invention will be apparent, but it is again emphasized that interpretation of the scope of my invention should only be conclusive when made in the light of the subjoined claims.

I claim:

1. A precision divider, comprising a casing having a removable top, a shaft rotatably mounted in the casing and formed with a pair of spools therein, a pair of tapes reversely wound on the spools, a dial on the shaft, an operating knob fixed on the shaft and having limited sliding movement with respect thereto, means for frictionally wedging said knob in adjusted position, a spring for normally holding the knob in adjusted position, a sliding block to which the free ends of the tape are connected, said block carrying a divider needle, a straight slot in the casing beneath the block through which the divider needle projects outwardly of the casing, a fixed divider needle on the bottom of the casing, and idler spools about which the tapes are trained to be positioned to approximate the sides of a triangle whereby to move the block and movable needle toward and away from the fixed needle in a straight line on turning the knob and shaft.

2. The invention as defined in claim 1 wherein the shaft has equally spaced flanges forming the spools to which the tapes are attached, and wherein the shaft has a conical bottom end fitting in a depression in a boss having sloping walls to prevent looseness of the shaft.

3. The invention as defined in claim 1 wherein the spools about which the tapes are turned are annularly flanged and are rotatably mounted adjacent the sides of the casing, and wherein the movable needle moves in the straight slot in the bottom of the casing.

4. The invention as defined in claim 1 wherein the block has a reduced end slidably fitting in key ways formed on the bottom of the casing and pins on said block above said reduced end to which the free ends of the tapes are attached.

5. The invention as defined in claim 1 wherein the enlarged base of the knob has a semi-circular slot, a stop pin on the top fitting in the slot to limit the movement of the knob and shaft, and wherein the tapes are mounted one above the other and extend outwardly at an angle to the shaft and are turned about idler spools to extend parallel with an end of the casing to engage and move the block in a straight line.

6. The invention as defined in claim 1 wherein the dial is fixed on the shaft above the tape spools and has graduations indicative of the measurements affected by the needles, and wherein the shaft is mounted slightly toward one end of the casing.

THOMAS EDWARD HYDE.